1,808,208

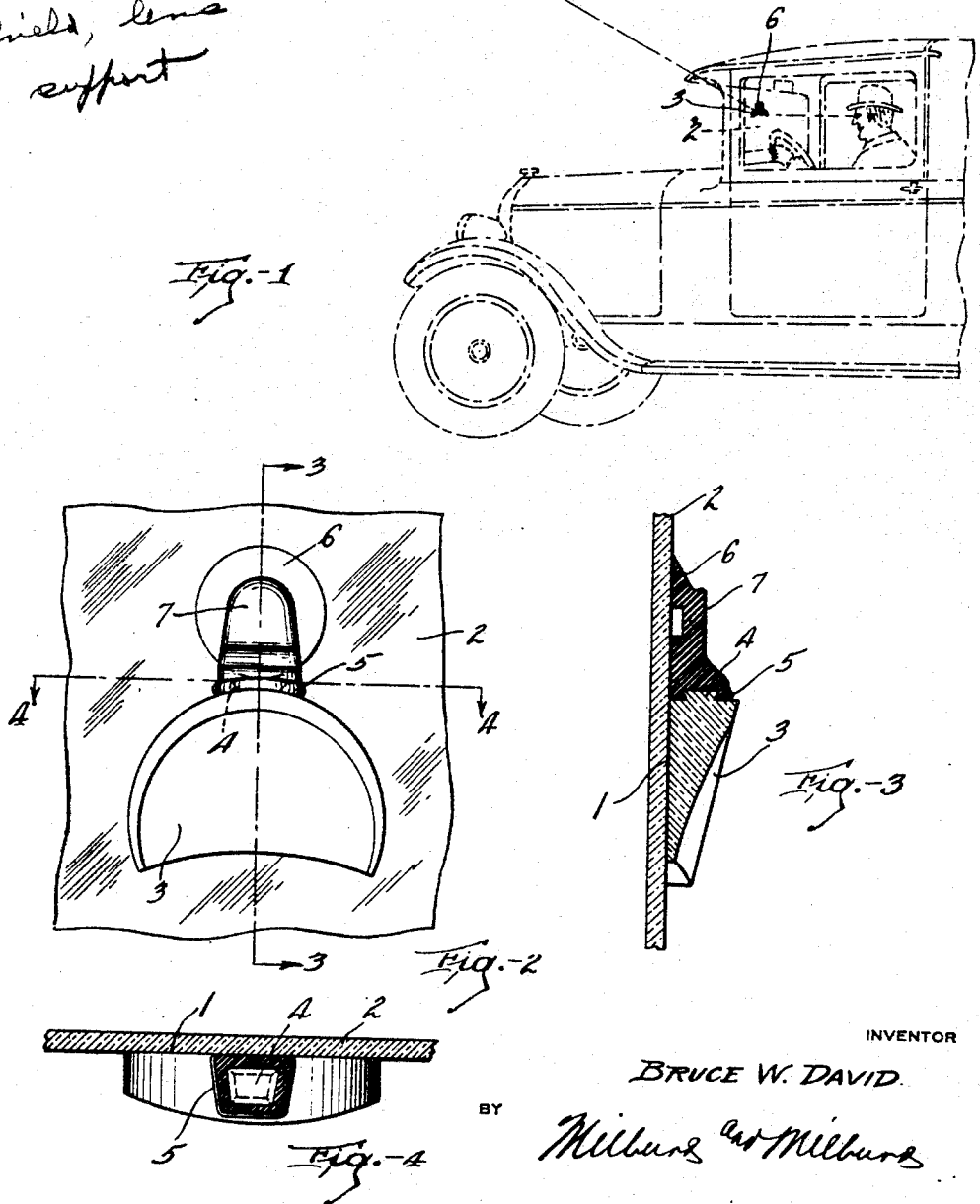
June 2, 1931.     B. W. DAVID     1,808,208
SIGNAL VIEWING ATTACHMENT FOR AUTOMOBILES
Filed Nov. 12, 1928
INVENTOR
BRUCE W. DAVID.
BY
ATTORNEYS Patented June 2, 1931

UNITED STATES PATENT OFFICE

BRUCE W. DAVID, OF CLEVELAND HEIGHTS, OHIO, ASSIGNOR TO THE MOONBEAM MANUFACTURING COMPANY, OF CLEVELAND, OHIO, A CORPORATION OF OHIO

SIGNAL VIEWING ATTACHMENT FOR AUTOMOBILES

Application filed November 12, 1928. Serial No. 318,764.

This invention relates to signal viewing attachments for automobiles and is an improvement upon my patent, Serial No. 1,637,309 of July 26, 1927.

According to the type of device disclosed in the patent above referred to, a plano-concavo lens is mounted inside the windshield of the automobile with the thick part of the lens at the top so as to facilitate the viewing of overhead traffic signals which would otherwise be obscured by the front part of the roof and without requiring the driver to assume an awkward position.

It has been found that when the lens is cemented to the windshield, as provided in the patent above referred to, there is the danger of the windshield becoming broken. There have been advanced several different theories or reasons for such breaking of the windshield at the point of the lens, but the most likely reason within the judgment of the applicant is that the attachment of the lens to the windshield, which amounts virtually to an increased thickness of the windshield at this point, prevents the normal flexure of the same.

Whatever may be the one correct theory or reason for the breaking of the windshield, under such circumstances, the present invention is calculated to altogether obviate this difficulty. Accordingly, the object of the present invention is to devise a lens attachment which can be applied to the windshield or other window of the automobile in such a manner that there will be no difficulty of the windshield or window breaking due to the presence of the lens.

More specifically, the present invention involves the use of a one-piece attachment of rubber or similar material to which the lens can be conveniently and securely attached and which can be readily applied to the windshield by means of suction.

According to the present invention, the rubber attachment consisting of only one part, is applied at the top of the lens and therefore does not obstruct the normal transmission of the rays of light of the signal through the lens. Furthermore, the attachment is of comparatively small dimensions and does not in any way obstruct the view of the driver of the automobile. Moreover, the attachment may be readily detached from the windshild at any time desired.

Other objects will appear from the following description and claims when considered together with the accompanying drawings.

Fig. 1 illustrates the general assembly and use of the present device; Fig. 2 shows the present form of device in elevation, as viewed by the driver of the automobile; and Figs. 3 and 4 are sectional views taken on lines 3—3 and 4—4, respectively, of Fig. 2.

In the present case, there is disclosed substantially the same form of lens as in the patent above referred to; namely, a plano-concavo lens which is mounted with the plain face 1 of the lens toward the windshield 2. The spherical surface of the lens is indicated by reference numeral 3 and is designed not only to bend the rays so as to facilitate the view of the signal by the driver without changing his normal position, but is also adapted to cover a comparatively wide field of view. It is to be understood, of course, that the exact design of lens may be modified without departing from the principle of invention as herein disclosed.

Cast as an integral part of the lens, I have provided the projection 4 on the top edge portion thereof and substantially midway thereof. This projection is of keystone shape so as to permit the lens and projection to be cast as one integral part, the particular form of projection facilitating the drawing of the casing from the mold, as will be apparent to those who are familiar with this particular art. The four sides of the projection 4 are undercut, as indicated in Figs. 2, 3, and 4, so as to permit an effective and secure engagement with the corresponding part of the rubber attachment. The one-piece rubber attachment which can be molded into the desired form as herein disclosed, has its under side provided with a cut-out portion of substantially the same size and shape as the projection 4 so as to have snug fitting engagement therewith. The marginal portion of the lower part of the rubber attaching means may be reinforced, as indicated by reference numeral 5, about the three sides thereof, so as to provide effective snap engagement over the edges of the projection 4. A cement may be applied so as to render this engagement more secure, if so desired.

The upper part of the rubber attaching means is in the form of a suction cup indicated in a general way by reference numeral 6 which is adapted to be applied to the glass of the windshield by depression of the button portion 7. Thus, it will be seen that the suction cup is provided upon the one side surface of the rubber attaching means while the point of engagement between the attaching means and the lens is upon the under side of the attaching means. In other words, the two engaging surfaces for the windshield and the lens, respectively, may be considered as being substantially 90° to each other.

It is to be understood, however, that the particular design of the rubber attaching means may be varied from the form as herein disclosed without departing from the present invention.

The lens and rubber attaching means are first assembled by snapping the under side of the rubber member over the projection 4 and the devices are placed upon the market in this condition. Then, in order to apply the assembled device to the windshield, it is merely necessary to moisten the surface of the suction cup which is to engage the windshield and to then press the same thereupon by means of the button 7 in the same customary manner which is familiar to those who are acquainted with the use of suction cups. When thus applied to the windshield, the plain surface 1 of the lens will occupy position substantially in contact with the glass of the windshield. In order to ensure such close engagement between the lens and the windshield, it may be found necessary to assemble the two parts, namely, the lens and the rubber attaching means, in such a manner that there will be an angular relation between the inner surfaces of these two members before application to the windshield. Such precaution might be necessary in order to avoid the lens extending rearwardly away from the windshield upon application of the suction cup thereto. Such precaution could be taken care of by properly designing the lower portion of the rubber attaching means. If so desired, the rubber member may be cemented to the windshield.

With the applicant's particular manner of engagement between the lens and the rubber attachment, there is no danger of the lens becoming accidentally removed from its proper position and likewise, there is no danger of the lens becoming accidentally displaced in a lateral direction. In other words, the lens is maintained against accidental dislodgment in any direction.

Because of the nature of the material employed in the attaching means and also because of the particular manner of attaching the same to the windshield, there is nothing to prevent or interfere with the normal flexure of the glass of the windshield, and therefore any and all danger of the breaking of the windshield because of the presence of the lens is removed. It will be noted that the attaching means is limited entirely to the surface of the suction cup and that the surface 1 of the lens is entirely free of any means of attachment.

Although the present device is herein disclosed as being applied to the inner surface of the windshield, yet it is to be understood that it may be applied to the outer surface, if so desired.

Thus, I have devised a means of attaching a signal-viewing lens to the windshield in such a manner that it may be used with all its numerous advantages and without any objection.

Furthermore, the means of attachment herein disclosed is of comparatively simple structure since it comprises a single integral part and is not costly to manufacture. Hence, the present device may be sold at a popular price. Moreover, it may be readily removed from the windshield at any time.

What I claim is:

1. In a device of the class described, the combination of a lens, and means engaging an annularly restricted portion of said lens for attaching the same to a glass window, said means consisting entirely of resilient material and having a portion adapted for attachment of the window.

2. In a device of the class described, the combination of a lens, and means engaging an annularly restricted portion of said lens for attaching the same to a glass window, said means consisting of a single member of resilient material and having a portion adapted for attachment to the window.

3. In a device of the class described, the combination of a lens, and means engaging an annularly restricted portion of said lens for attaching the same to a glass window, said means consisting of a single member of rubber and having a suction cup for attachment to the window.

4. In a device of the class described, the combination of a lens, and means engaging said lens for attaching the same to a glass window, said means consisting of a single member of rubber having a suction cup for attachment to the window, and the surface portions thereof which engage the lens and window, respectively, extending at substantially ninety degrees to each other.

5. In a device of the class described, the combination of a suction cup adapted for attachment to a glass window, and a lens having direct depending attachment to the suction cup.

6. In a device of the class described, the combination of a lens having an integral projection, and a single flexible attaching member having direct supporting engagement with said projection and having also means of direct attachment to the window.

7. In a device of the class described, the combination of a lens having an integral projection, and a one-piece rubber member having a portion in direct engagement with said projection and having an integral suction cup adapted for direct attachment to a glass window.

8. In a device of the class described, the combination of a lens having an upper thickened portion and being adapted to deflect overhead signals to the eye of the driver of an automobile, said lens having an integral projection on the thickened portion thereof, and a rubber attaching means having direct engagement with said projection and having a suction cup for direct attachment to the automobile window.

9. In a device of the class described, the combination of an automobile glass window, a lens having a thicker part at the top and so positioned as to aid the driver in viewing overhead traffic signals which would otherwise be obscured by the top part of the automobile while the driver occupies normal posture, the top part of the lens having an integral projection with undercut sides, and a one-piece rubber member having a correspondingly formed seat in its under side for snug supporting spring engagement over said projection and having a suction cup on its upper part for attachment to the glass window of the automobile.

10. In a device of the class described, the combination of an automobile glass window, a lens having a thicker part at the top and so positioned as to aid the driver in viewing overhead traffic signals which would otherwise be obscured by the top part of the automobile while the driver occupies normal posture, the top edge of said lens having an integral projection of substantially key-stone shape with under-cut sides, and a one-piece rubber member having a correspondingly formed seat in its under side for snug supporting snap engagement over said projection and having its side formed as a suction cup adapted for attachment to the glass window of the automobile, said parts being so constructed and arranged that the surface of the lens adjacent the glass window will lie substantially in contactual engagement therewith.

11. In a device of the class described, the combination of a lens having an integral projection, and a one-piece rubber member having a portion in direct engagement with said projection and having also an integral portion adapted for direct attachment to a glass window.

In testimony whereof, I hereby affix my signature:

BRUCE W. DAVID.